United States Patent [19]
Wilde et al.

[11] Patent Number: 5,797,539
[45] Date of Patent: Aug. 25, 1998

[54] CIRCUIT BOARD REFLOW OVENS

[75] Inventors: Mark A. Wilde, Brockport; Mark D. Romeo, Rochester, both of N.Y.

[73] Assignee: Eastman Kodak Company, Rochester, N.Y.

[21] Appl. No.: 701,261

[22] Filed: Aug. 22, 1996

[51] Int. Cl.$^6$ .......................... B23K 37/04; B23K 37/047
[52] U.S. Cl. .................. 228/180.1; 228/6.2; 228/49.5
[58] Field of Search ..................... 228/6.2, 49.5, 228/180.1

[56] References Cited

U.S. PATENT DOCUMENTS

| | | | |
|---|---|---|---|
| 4,512,508 | 4/1985 | Pachschwöll | 228/180.1 |
| 4,938,410 | 7/1990 | Kondo | 228/180.1 |
| 5,259,546 | 11/1993 | Volk | 228/102 |

FOREIGN PATENT DOCUMENTS

| | | | |
|---|---|---|---|
| 1-205594 | 8/1989 | Japan | 228/180.1 |
| WO 89-01283 | 2/1989 | WIPO | 228/180.1 |

Primary Examiner—Patrick Ryan
Assistant Examiner—Jeffrey T. Knapp
Attorney, Agent, or Firm—Arthur H. Rosenstein

[57] ABSTRACT

An electronic circuit board solder reflow device for heating flux and transporting the circuit board from further treatment includes a conveyor for transporting the circuit board through a heating solder area to an output conveyor for further treatment. The reflow oven conveyor transports the circuit board through the solder reflow oven with an intermediate conveyor which bridges the gap between the reflow oven conveyor and the output conveyor.

13 Claims, 2 Drawing Sheets

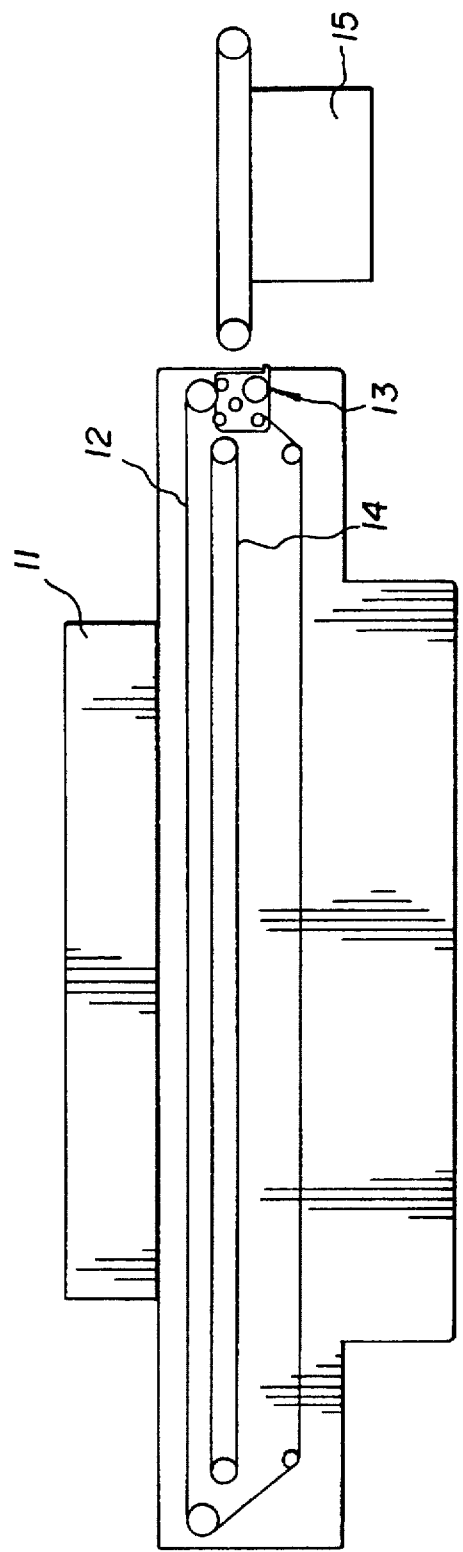

CIRCUIT BOARD REFLOW OVENS

FIELD OF THE INVENTION

The present invention concerns a procedure for reflowing-soldering electronic components onto a printed circuit board and transporting the board for further treatment, as well as an arrangement for implementing this procedure.

BACKGROUND OF THE INVENTION

In reflow-soldering, solder is applied to the printed board at the places that are to receive an electronic component. The components are laid on the solder, which is in solid state. The printed-board assemblies are then heated until the solder melts, and subsequently cooled again, whereupon the solder hardens. In this procedure, the electronic components are also heated to relatively high temperatures, so that the solder bonds with the components. In known procedures, in order to minimize heat stress on the components, the printed-board assemblies are first heated in a preheating zone to a preheat temperature that is below the melting point of the solder, and then briefly explodes to a temperature at which the solder melts (EP 0 325 451 A1). In the process, the printed boards pass continuously through the preheating zone and then through the soldering zone on a conveyor and finally to further treatment.

The temperatures are controlled through regulation of the heat output in the individual zones, which is set so that the desired temperatures are reached in the preheating zone on the one hand and the soldering zone on the other, during the exposure time determined by the conveyance speed. A process such as this is disclosed in U.S. Pat. No. 5,259,546.

Inherent in such systems is the need to convey circuit boards from solder reflow ovens to output conveyors for further treatment such as cooling. Reflow ovens typically have two internal conveyor systems.

One conveyor is an edge conveyor that transports circuit boards through the oven by gripping only the outside edges of the circuit board and holding the circuit board suspended while in transport and the other is a flat belt conveyor that the circuit board is laid flat on and transported through the oven and then on to an output conveyor for further treatment.

The reflow ovens due to the mechanical characteristics of incorporating the above edge conveyor system which wraps around the above flat belt conveyor system have a difference in their overall conveyor length with the edge conveyor having the greater length.

Unfortunately, due to the design of these two different conveyor systems the "flat belt" system ends several inches shorter than the "edge" conveyor system and creates a gap to the next section of conveyors when using the flat belt conveyor.

External in-line output conveyor systems are typically mated to the longer edge conveyor system to transport the circuit board from the reflow oven downstream for further processing. Therefore, when using the shorter belt conveyor there is a gap between the end of the belt conveyor and the above mentioned in-line output conveyor.

The problem with this arrangement of conveyors is seen in a circuit board solder reflow oven, model 1800 by Heller Manufacturing that provides both edge convey and flat chain belt conveyor systems. There is approximately a 4 inch length differential between the end of the edge conveyor and the end of the flat chain conveyor.

Most of the circuit boards that are processed through the oven are edge conveyed, so offload conveyors are adjusted to the length of the edge conveyors which leaves a 4 inch gap between the end of the flat chain conveyor and the end of the offload conveyor. This results in a problem when small circuit boards that are running through the oven on the flat main conveyor, try to bridge that gap. The intermediate reflow oven conveyor of this invention allows small circuit boards to bridge this gap easily.

SUMMARY OF THE INVENTION

An object of the present invention is to construct reflow oven apparatus such as the Keller 1800 reflow oven so that the length gap between the end of the edge and flat belt conveyors is eliminated and this is accomplished using no external drive source.

A further object of the invention is to construct less expensive conveyors than those presently in use.

Another object of the invention is to allow the conveyors to be positioned for each application.

Yet another object of the invention is to be able to add or subtract assemblies to meet application needs.

It is also an object of the invention to keep the ovens running as long as the conveyors are running.

The above objects are accomplished in the process and apparatus for soldering circuit boards and conveying to another operation, by the use of an intermediate conveyor that bridges the gap between conveyors and is adjustable for spacing and is permanently driven by the existing machine drives.

Thus, a method for soldering and further treating electronic circuit boards comprises:

i) conveying the assembly through a soldering zone, wherein a plurality of electronic components are mounted in associated solder areas; and ii) conveying the circuit board assembly for a further treatment by an output conveyor the length of which is less than that of the conveyor in step i) the improvement comprising transporting said assembly from step i) to step ii) on an intermediate reflow oven conveyor, the length of which is less than that of the conveyors in steps i) and ii) and which is driven by the equipment used to drive the conveyor in step i), said intermediate reflow oven conveyor bridging the gap between the reflow oven conveyor and the output conveyor.

In another object of this invention apparatus for achieving the above comprises a soldering zone having a heater element adjusted to heat the circuit board to a predetermined temperature;

a conveyor for conveying the circuit board through said soldering zone;

an output conveyor for conveying the circuit board assembly from the soldering zone to an area for further treatment, the length of which is less than that of the conveyor;

an intermediate reflow oven conveyor, the length of which is less than that of the conveyor and output conveyor; and means to drive the conveyor, output conveyor and intermediate reflow oven conveyor.

BRIEF DESCRIPTION OF THE DRAWINGS

FIG. 2 is an assembled view of the intermediate oven conveyor installed at the end of a circuit board reflow oven.

Figure 1:
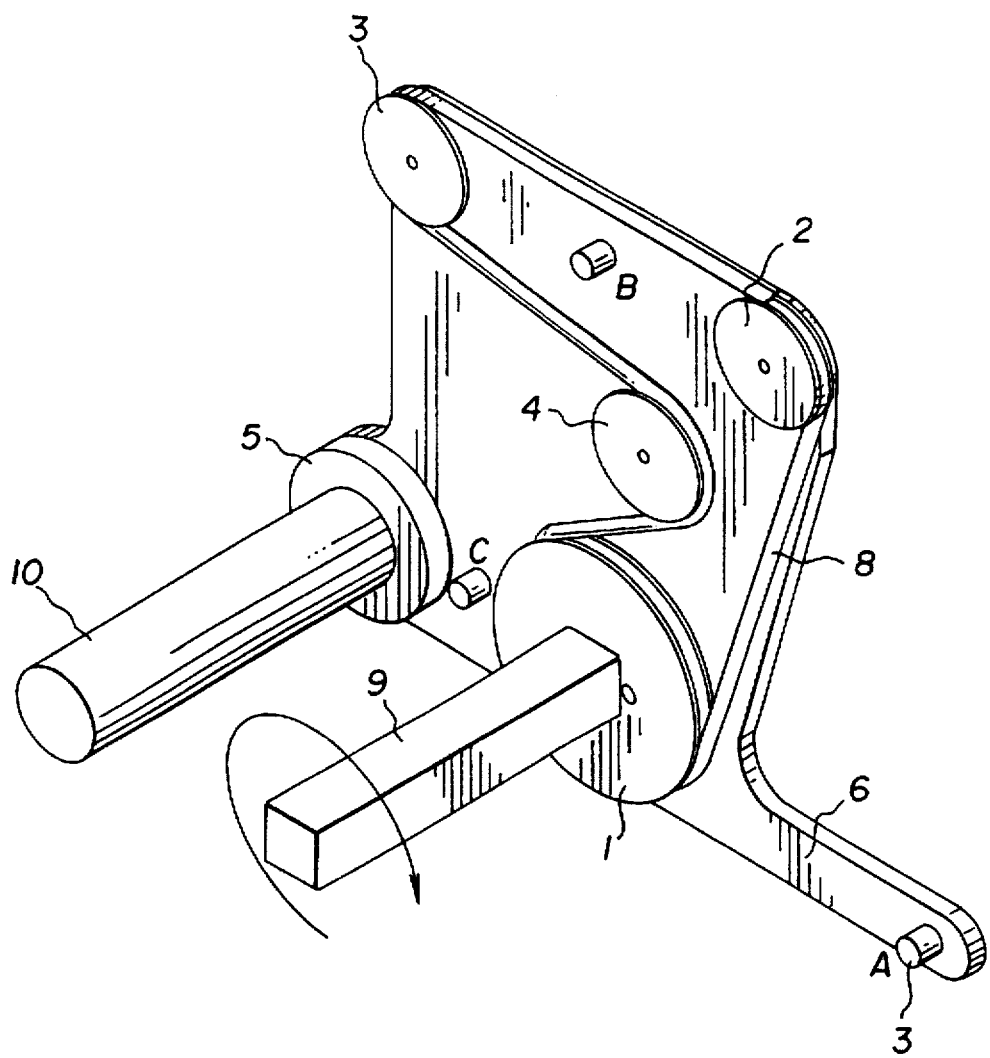
FIG. 1 is a detailed drawing of the intermediate oven conveyor.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

In a process of soldering electronic components such as in electronic circuit boards, the general procedure is to preheat the assembly, carry the board through a soldering zone and then transport for further treatment such as cooling.

The preheating zone is set at a constant preheat temperature just slightly below the melting temperature of the solder, at a level tolerable for all components with the largest heat capacity just reach the preheat temperature; this ensures that the printed board assembly reaches the highest possible preheat temperature, thus greatly shortening the subsequent soldering time, without the smaller components becoming overheated, since these cannot reach a temperature above the preheat temperature.

Independent of the conveyance speed in the preheating zone, the conveyance speed in the soldering zone is set so that the solder for the component with the largest heat capacity just finishes melting. Since the procedure according to the invention ensures that all components have reached a preheat temperature just slightly below the melting temperature, the exposure time in the soldering zone can be extremely short, so that the smaller components are not overheated in the soldering zone.

According to an embodiment of the invention, the ambient temperature in the preheating zone is adjusted to the desired preheat temperature. The atmosphere in the preheating zone, which preferably consists of air but can also be a gas mixture, is heated to a given constant value with convector heaters. The printed board and components are heated by means of heat exchange between this atmosphere and the articles to be heated.

In another embodiment of the invention, the printed board and the components are heated to the melting temperature of the solder by means of radiant heaters provided in the soldering zone. These heaters can radiate considerable heat in spite of their compact size; thus the exposure time at the higher temperatures can be kept short and the danger of damage to electronic components avoided.

To ensure that changing ambient temperatures in the soldering zone do not distort the heating of the printed board and the components it is further provided for the ambient temperature in the soldering zone to be set at a maximum temperature in the vicinity of the melting temperature, but preferably just below this melting temperature. This way the atmosphere in the soldering zone essentially serves only to maintain the temperature reached in the preheating zone and does not help raise the temperature to the melting point. The ambient temperature in the soldering zone is best regulated by means of controlled hot-air suction ventilation and fresh air supply.

To accelerate the preheating of the printed board and components, another embodiment provides for preheating the printed board in two stages, first to a level below the preheat temperature, using a booster temperature high than the preheat temperature; and then to the predetermined ultimate temperature of the preheating zone, using a temperature equivalent to the preheat temperature.

To implement the procedure using an arrangement with at least one preheating zone and a soldering zone, each equipped with heating elements and a conveyor system for the printed boards that is through the preheating zone and the soldering zone in succession, the invention provides for this conveyor system to consist of an optional initial conveyor assigned to the preheating zone, and a second conveyor assigned to the soldering zone, an output conveyor for transport for further treatment and between the latter conveyors an intermediate oven conveyor.

The preheating and soldering zones are designed essentially as closed chambers, each having an entry opening and an exit opening for the respective conveyor, so that the conditions maintained in the chambers do not influence one other.

According to an embodiment of the invention, in order to maintain particular ambient temperature in the soldering chamber, the chamber is equipped with a forced ventilation system triggered by a temperature probe that senses the consolute temperature in a suction device, so that the ambient temperature in the soldering chamber remains constant.

In FIG. 1, the intermediate reflow oven conveyor assembly is shown apart from the solder reflow oven. The intermediate reflow oven conveyor, driven pulley 1 is driven by the driven square shaft 9 which is on the circuit board reflow oven 11 (shown in FIG. 2). The driven pulley I drives an 0-ring drive belt 8 around the circumference of three idler pulleys 2,3,4. The driven pulley and the idler pulleys are supported by a frame 6. The frame is attached to the existing reflow oven by a guide bearing 5 and the driven pulley 1. The entire assembly is able to slide along the driven shaft 9 and the fixed shaft 10 for specific positioning. Multiple assemblies are added to the existing circuit board reflow oven to accommodate different width applications.

Thus, the process comprises conveying the circuit assembly through a first preheat unit (not shown) through the solder reflow oven to the end of the reflow oven conveyor. The relative sizes of the conveyors are 1) the reflow oven conveyor is 12 ft. in length, 2) the intermediate oven conveyor is 4 inches in length, and 3) the output conveyor varies between 1 ft. and 20 ft. in length. The apparatus for carrying out the process is shown in FIG. 2. The edge conveyor is needed as many circuit boards have components on the bottom of the boards which would be damaged by chain belts. The edge conveyor holds the circuit boards by the edges so as not to damage them. The advantage of using the intermediate reflow oven conveyor is that small and medium size circuit boards can now be transferred from one conveyor to the next easily.

In FIG. 2, the intermediate conveyor or multiple intermediate conveyor assemblies 13 are mounted on the existing circuit board reflow oven 11 at the output end of the reflow oven. The intermediate conveyors are mounted between the guiding rails by fixed shaft 10 and driven shaft 9 of the circuit board edge conveyor 12 and align to the end of the circuit board flat belt conveyor 14. The intermediate reflow oven conveyor assemblies 13 are positioned along the fixed shaft 10 and the driven shaft 9 to approximate the width of circuit board to be conveyed. This is done by manual positioning. As the circuit boards can be of different widths, the intermediate conveyor assemblies are held in place by very light interference fits between the shafts and pulleys.

The intermediate conveyor assemblies convey the circuit board from the circuit board flat belt conveyor 14 to an output conveyor 15. The output end of the intermediate oven conveyor assemblies 13 align with the output end of the circuit board edge conveyors 12. Therefore a circuit board being conveyed on top of the flat belt conveyor 14 will traverse the same distance as a circuit board being conveyed by the circuit board edge conveyor 12.

The output conveyor is used to transport the soldered electronic circuit board to the next process which can be hand assemblies, board cleaning, inspection or the like.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of conveying a printed circuit board assembly from a reflow soldering station to further treatment comprising the steps of:
   i) conveying the assembly through a soldering zone, wherein a plurality of electronic components are mounted in associated solder areas; and
   ii) conveying the circuit board assembly for a further treatment by an output conveyor the length of which is less than that of the conveyor in step i) the improvement comprising transporting said assembly from step i) to step ii) on an intermediate reflow oven conveyor, the length of which is less than that of each of the conveyors in steps i) and ii) and which is driven by the equipment used to drive the conveyor in step i), said intermediate reflow oven conveyor bridging the gap between the reflow oven conveyor and the output conveyor.

2. The method of claim 1 wherein the printed circuit board assembly comprises a printed circuit board, a plurality of solder areas and a plurality of electronic components mounted in associated solder areas.

3. The method of claim 1 wherein the further treatment comprises cooling the board assembly.

4. The method of claim 1 wherein the conveyor used in step i is a flat bed conveyor.

5. The method of claim 3 wherein the conveyors of steps i and ii are mounted between guiding rails of an edge conveyor.

6. Apparatus for conveying a circuit board through a reflow soldering system comprising:
   a soldering zone being a heater element adjusted to heat the circuit board to a predetermined temperature;
   a conveyor for conveying the circuit board through said soldering zone;
   an output conveyor for conveying the circuit board from the soldering zone to an area for further treatment, the length of which is less than that of the conveyor;
   an intermediate reflow oven conveyor for bridging the conveyor with the output conveyor the length of which is less than that of each of the conveyor and output conveyor; and
   means to drive the conveyor, output conveyor and intermediate reflow oven conveyor.

7. The apparatus of claim 6 wherein all of the conveyors are flat belt conveyors.

8. The apparatus of claim 6 wherein the soldering zone comprises at least one radiant heater.

9. The apparatus of claim 6 wherein said further treatment comprises cooling the board.

10. The apparatus of claim 6 wherein the intermediate reflow oven conveyor is a plot plate mounted vertically with bearing mounted pulleys that circulate an O-ring belt that conveys the circuit board from the end of the conveyor to the beginning of the output conveyor.

11. The apparatus of claim 6 further containing an edge conveyor.

12. The apparatus of claim 11 wherein said edge conveyor comprises guide rails.

13. The apparatus of claim 12 wherein the conveyor and intermediate reflow oven conveyor are mounted between guiding rails of said edge conveyor.

* * * * *